United States Patent

Hagiwara

[15] 3,662,938

[45] May 16, 1972

[54] DEVICE FOR MOVING A PINCH ROLLER

[72] Inventor: Yukio Hagiwara, Tokyo, Japan

[73] Assignee: Pioneer Electronic Corporation, Tokyo, Japan

[22] Filed: June 1, 1970

[21] Appl. No.: 42,443

[30] Foreign Application Priority Data

May 31, 1969 Japan....................................44/50087

[52] U.S. Cl.................................................226/90, 226/176

[51] Int. Cl..........................................................G11b 15/66

[58] Field of Search....................226/90, 180, 176, 177, 186, 226/187

[56] References Cited

UNITED STATES PATENTS 3,145,894 8/1964 Nagaoka...............................226/180

*Primary Examiner*—Allen N. Knowles
*Attorney*—Sughrue, Rothwell, Mion, Zinn & Macpeak

[57] ABSTRACT

A device for pressing a capstan against a pinch roller in a magnetic tape recorder/reproducer perpendicularly elevates a supporting shaft of the pinch roller parallel with the capstan by a lever which converts the movement of a plunger to an elevational movement. Simultaneously the supporting shaft of the pinch roller is moved horizontally into parallel contact with the capstan by pressing the supporting shaft or bearing of the supporting shaft by movement of the same lever.

4 Claims, 8 Drawing Figures

INVENTOR
YUKIO HAGIWARA
BY Sughrue, Rothwell, Mion, Zinn & Macpeak
ATTORNEYS

Patented May 16, 1972 3,662,938

2 Sheets-Sheet 2

DEVICE FOR MOVING A PINCH ROLLER

BACKGROUND OF THE INVENTION

1. Field of the Invention

This invention relates to a device for moving a pinch roller in a magnetic tape recorder/reproducer, and more particularly to an improved magnetic tape recorder and reproducer adapted to maintain a uniform contact between the pinch roller and capstan thereof.

2. Description of the Prior Art

Heretofore, there exists various types of mechanisms for pressing a pinch roller against a capstan on the upper board of the tape recorder and reproducer by means from under the board, but it is very difficult for the peripheral surface of the pinch roller to be pressed correctly onto the peripheral surface of the capstan without the tape thereon tending to shift upwardly or downwardly.

SUMMARY OF THE INVENTION

This invention contemplates elimination of the aforementioned disadvantages of the conventional tape recorder and reproducer and provides a novel and improved device for moving a pinch roller shaft always in parallel with the capstan shaft.

The present invention provides a device for pressing a pinch roller in parallel with a capstan in a magnetic tape recorder and reproducer which holds a pinch roller supporting shaft uniformly on a capstan for elevating the shaft in parallel with said capstan and also for horizontally moving the shaft parallel to said capstan.

According to one aspect of the present invention, there is provided a device for pressing a pinch roller in parallel contact with a capstan in a magnetic tape recorder and reproducer which comprises means for perpendicularly elevating the supporting shaft of the pinch roller parallel with the capstan, and means for horizontally moving the supporting shaft of the pinch roller, parallel to the capstan, whereby the pinch roller supporting shaft is always held parallel with the capstan.

The other object, features and advantages of the present invention will become apparent from the following description taken in conjunction with the accompanying drawings.

DESCRIPTION OF THE PREFERRED EMBODIMENTS

Figure 1:
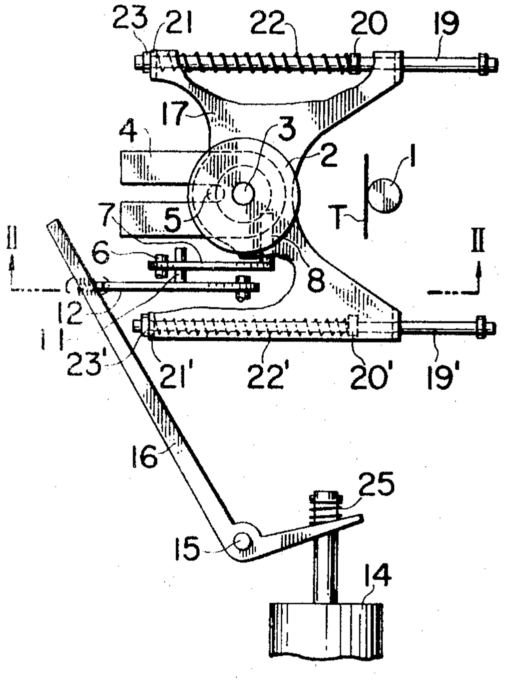
FIG. 1 is a plan view of a pinch roller mechanism constructed in accordance with the present invention wherein the pinch roller rests on the upper board of a tape recorder and reproducer.
Figure 2:
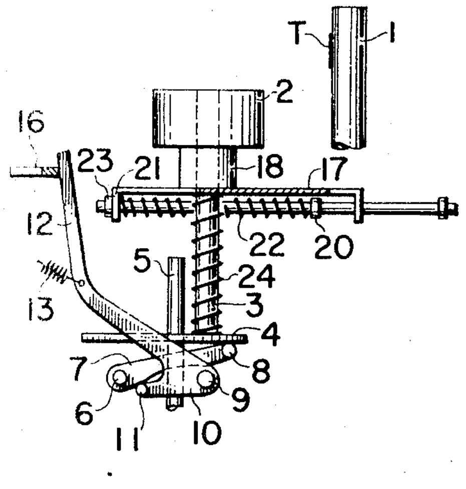
FIG. 2 is a side view of the mechanism taken along the line A—A in FIG. 1.

Reference is now made to the drawings, and particularly to FIGS. 1 and 2, which shows one embodiment of the present invention.

The arrangement illustrated comprises a capstan 1, a pinch roller 2 supported on a supporting shaft 3 and a movable plate 4 fixed to the lower end of the supporting shaft 3. A guide bar 5 engages the movable plate 4, a lever 7 is pivoted on a fulcrum 6 at one end and the other end 8 contacts the movable plate 4. A bell crank 10 is pivoted on a fulcrum 9 and has one end 11 contacting the lower surface of the lever 7 with lever 12 integrally formed therewith. A spring 13 urges the lever 12 of the bell crank 10 counterclockwise. A plunger 14 carries a lever 16 pivoted on a fulcrum 15 intermediate the ends and one end engages with the plunger 14. A bearing 18 receives the pinch roller supporting shaft 3 and is fixed to the lower portion to the movable plate 17. Fixed rails 19 and 19' are supported on the movable plate 17 and carry stops 20 and 20'. Stops 23 and 23' are disposed at the left end of the rail with springs 22 and 22' connected to the left ends 21 and 21' of the movable plate and pressed thereagainst. A spring 24 is connected at one end to the lower surface of the movable plate 17 and at the other end to the movable plate 4 for preventing the movable plate from floating. A spring 25 engages the end of the plunger 14.

Figure 4:
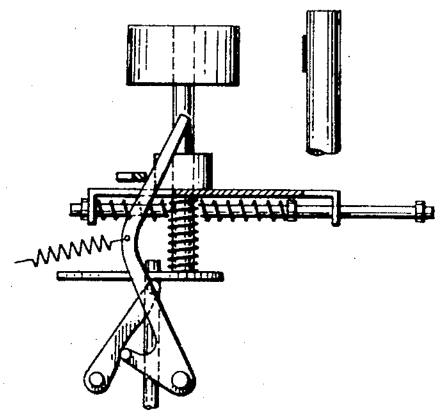
FIG. 4 is a side view of the mechanism taken along the line B—B in FIG. 3.

In operation of a thus constructed mechanism, in FIGS. 1 and 2, when the lever 16 is moved to the right about the fulcrum 15, by the actuation of the plunger 14, it at first presses rightwardly the lever 12 of the standing bell crank 10 against the tension of the spring 13. As the lever 12 moves rightwardly, the end 11 of the bell crank 10, supported by the fulcrum 9, pushes up against the lower surface of the lever 7 pivoted at the fulcrum 6. After the lever 7 is raised to the desired height at the other end 8 of the lever 7, and in order not to elevate the end 8 of the lever 7 even if the end 11 of the bell crank 10 is further raised, at the desired height of the end 11 of the bell crank 10, it is on a circle whose radius is the distance to the outer edge of the end 11 thereof using the fulcrum 9 as a center thereof. As the other end 8 of the lever 7 elevates, the movable plate 4 at the end 8 of the lever 7 is elevated together with the supporting shaft 3 for the pinch roller 2, while it is held within the bearing 18, against the pressure of the spring 24 and along the guide 5 as shown in FIG. 4 so that the pinch roller 2 now stands well above the upper board 17.

Figure 5:
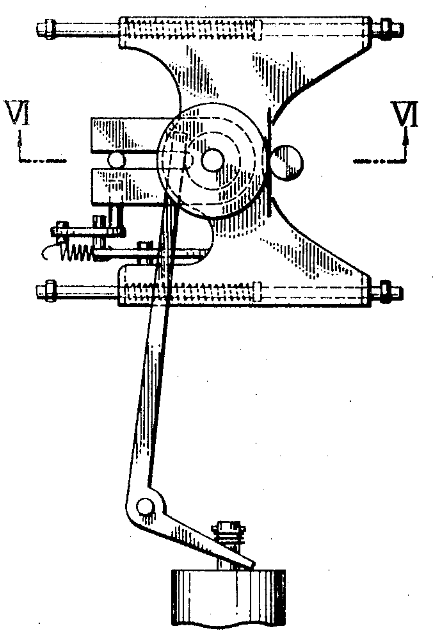
FIG. 5 is a plan view of the mechanism wherein the pinch roller has moved to the right to press against the capstan.
Figure 6:
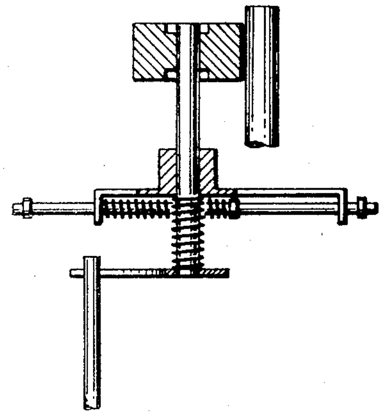
FIG. 6 is a sectional view of the mechanism taken along the line C—C in FIG. 5.

Then the lever 16 continues to move rightwardly in the drawing, the lever 16 presses the lever 12 of the bell crank 10 on the bearing 18 so that the sleeve bearing 18 moves to the right guided by the rails 19 and 19' against the springs 22 and 22' connected to the leftmost ends 21 and 21' of the movable plate 17 and the stops 20 and 20' of the rail. At the same time the pinch roller 2 carried on the supporting shaft 3 and held by the bearing is pressed onto the capstan 1 as shown in FIGS. 5 and 6.

Figure 3:
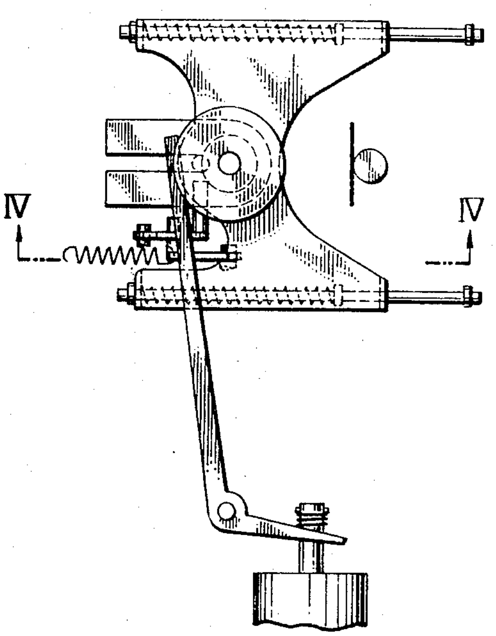
FIG. 3 is a plan view of the mechanism similar to FIG. 1 but showing the case where the pinch roller is raised on the upper board.

The tape T is held under uniform pressure between the capstan 1 and the pinch roller 2 and is drawn. Then, in order to free the pressure of the pinch roller 2 on the capstan 1 so as to return it beneath the upper board, if the actuation of the plunger 14 is released, the pressure of the lever 16 onto the bearing 18 is released so that the bearing 18 moves the lever 16 with the pinch roller supporting shaft 3 under the tension of the springs 22 and 22' to return to the state shown in FIGS. 3 and 4. The lever 12 further presses the lever 16 by the tension of the spring 13 whereupon the end 8 of the lever 7 is lowered with the result that the movable plate 4 on the end 8 of the lever 7 is positively lowered by the pressure of the spring 24 together with the supporting shaft 3 with the pinch roller 2 falling onto the upper board as shown in FIGS. 1 and 2.

Figure 7:
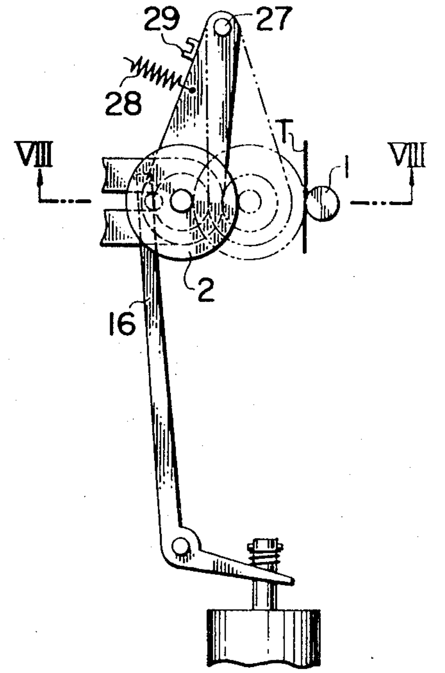
FIG. 7 is a plan view of the mechanism in FIG. 3 in the form of a modified embodiment wherein the transverse movement of the pinch roller after the pinch roller is raised, is performed by an arm moving horizontally in arcuate configuration.
Figure 8:
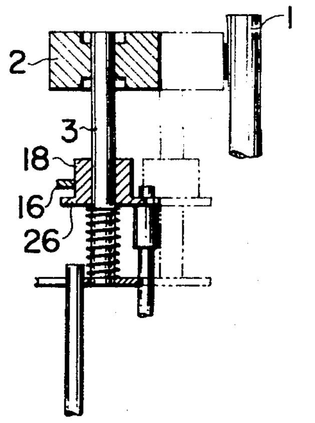
FIG. 8 is a sectional view of the mechanism taken along the line D—D in FIG. 7 illustrating how the pinch roller is pressed against the capstan.

Instead of the transverse linear movement of the pinch roller on a rail after the pinch roller stands it may be moved horizontally in arcuate configuration by an arm. In FIGS. 7 and 8, the arm 26 is urged to the left by the spring 28 pivoting at fulcrum 27 so that it may stop at the stop 29. The bearing 18 supporting the supporting shaft 3 is fixed to the end of the arm 26. The pinch roller 2 held on the supporting shaft 3 presses onto the capstan 1 by the horizontal movement thereof. The other structure except the transverse movement is the same as the description hereinbefore described and accordingly will not be further described.

It should be understood from the foregoing description that since the pinch roller supporting shaft is always held parallel to the capstan, there can occur no irregular pressure by the pinch roller on the capstan and thus improves the performance of the arrangement.

What is claimed is:

1. A device for pressing a pinch roller against a capstan in a magnetic recorder and reproducer while maintaining parallelism between the contacting peripheral surfaces of said roller and capstan, said device comprising:

first means for elevating the supporting shaft of said pinch roller in a direction parallel to the capstan axis and from a position below said capstan to a laterally aligned position therewith, second independent means for laterally moving said aligned pinch roller into contact with said capstan, and common means acting on said first means and said second means to sequentially move said pinch roller first in the direction of its axis and secondly orthogonal thereto.

2. A device as set forth in claim 1, wherein a movable plate is fixed to the lower end of said pinch roller supporting shaft, a guide bar engages said movable plate, a lever is pivoted at one end and has the other end contacting said movable plate, a pivoted bell crank includes one end in supporting contact with the lower surface of said lever and another end defining a second lever integrally formed therewith, and a spring biases said bell crank lever toward pinch roller depressed position.

3. A device as set forth in claim 1, wherein said common means comprises a plunger, a lever pivoted intermediate of its ends and having one end engaging said plunger, a movable plate fixed to the lower end of said supporting shaft, a bearing for the pinch roller supporting shaft fixed to said movable plate, means engaged by said lever for contacting said movable plate to move the same, rails slidably supporting said movable plate for movement between stops, compression springs between one end of said movable plate and respective stops, and another spring for preventing said movable plate from floating.

4. A device for pressing a pinch roller against and in parallel with a capstan in a magnetic tape recorder and reproducer comprising: a capstan, a pinch roller supported on a supporting shaft for said pinch roller, a first movable plate fixed to the lower end of said supporting shaft, a guide bar in engagement with said first movable plate, a first lever pivoted at one end and having the other end supporting said movable plate, a pivoted bell crank including one end for supporting the lower surface of the first lever and a second lever integrally formed therewith, a spring for biasing the second lever toward pinch roller depressed position, a plunger, a third lever pivoted intermediate its ends and having one end engaging said plunger, a bearing for said pinch roller supporting shaft fixed to a second movable plate, rails slidably supporting said second movable plate between stops with stops disposed at one end of said rail and biasing springs toward one end of said second movable plate, a spring connected at one end to the lower surface of said first movable plate and at the other end to the upper surface of said second movable plate for preventing the first movable plate from floating, and a spring engaged with the end of said plunger for biasing said third lever into contact with said second lever.

* * * * *